US012632671B2

(12) United States Patent
Achara et al.

(10) Patent No.: US 12,632,671 B2
(45) Date of Patent: May 19, 2026

(54) CLINICAL CONTEXT CENTRIC NATURAL LANGUAGE PROCESSING SOLUTIONS

(71) Applicant: GE Precision Healthcare LLC, Wauwatosa, WI (US)

(72) Inventors: Akshit Achara, Bengaluru (IN); Shivappa Goravar, Bengaluru (IN); Sanand Sasidharan, Bangalore (IN); Anuradha Kanamarlapudi, Bengaluru (IN)

(73) Assignee: GE Precision Healthcare LLC, Waukesha, WI (US)

( * ) Notice: Subject to any disclaimer, the term of this patent is extended or adjusted under 35 U.S.C. 154(b) by 316 days.

(21) Appl. No.: 18/183,295

(22) Filed: Mar. 14, 2023

(65) Prior Publication Data

US 2024/0311580 A1      Sep. 19, 2024

(51) Int. Cl.
| | |
|---|---|
| *G06F 40/30* | (2020.01) |
| *G06F 16/35* | (2019.01) |
| *G06F 16/383* | (2019.01) |
| *G06F 40/40* | (2020.01) |

(52) U.S. Cl.
CPC .............. *G06F 40/40* (2020.01); *G06F 16/35* (2019.01); *G06F 16/383* (2019.01)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS

| | | | | |
|---|---|---|---|---|
| 7,610,192 B1 * | 10/2009 | Jamieson | .............. | G06F 40/131 |
| | | | | 705/2 |
| 10,929,420 B2 * | 2/2021 | Xu | ........................ | G06F 40/258 |
| 11,031,107 B2 * | 6/2021 | Liang | ..................... | G16H 10/20 |
| 11,335,461 B1 * | 5/2022 | McNair | ................. | G16B 40/00 |

(Continued)

OTHER PUBLICATIONS

Saad et al., "A Comparison of Two Document Clustering Approaches for Clustering Medical Documents", Conference on Data Mining, DMIN'06, 2006, pp. 425-431.

(Continued)

*Primary Examiner* — Lamont M Spooner
(74) *Attorney, Agent, or Firm* — Amin, Turocy & Watson, LLP

(57) ABSTRACT

Techniques are described for generating natural language processing (NLP) solutions in the medical domain tailored based on clinical context. In one example a method comprises receiving, by a system comprising a processor, a plurality of medical reports respectively comprising medical text and separating the medical reports into different groups of similar reports respectively corresponding to different clinical contexts based on contextual attributes associated with the medical reports. The method further comprises training, by the system, training, by the system, a separate machine learning model to perform a natural language processing task on each group of the different groups of similar reports, resulting in different machine learning models respectively adapted to perform natural language processing tasks on the different groups such that the natural language processing tasks are tailored to the different clinical contexts respectively associated with the different groups.

20 Claims, 9 Drawing Sheets

(56) References Cited

U.S. PATENT DOCUMENTS

| | | | | |
|---|---|---|---|---|
| 11,357,444 | B1 * | 6/2022 | McNair | A61B 5/4836 |
| 11,620,320 | B1 * | 4/2023 | Shukla | G06F 40/30 |
| | | | | 707/692 |
| 11,862,305 | B1 * | 1/2024 | Sethi | G06V 30/416 |
| 2005/0154701 | A1 * | 7/2005 | Parunak | G06F 16/367 |
| 2009/0259670 | A1 * | 10/2009 | Inmon | G06F 40/151 |
| 2012/0191716 | A1 * | 7/2012 | Omoigui | H10F 39/1825 |
| | | | | 707/E17.069 |
| 2015/0081276 | A1 * | 3/2015 | Gerard | G06F 40/211 |
| | | | | 704/9 |
| 2017/0177995 | A1 * | 6/2017 | Hillar | G06N 3/08 |
| 2018/0046764 | A1 * | 2/2018 | Katwala | G16H 15/00 |
| 2018/0121843 | A1 * | 5/2018 | Connely, IV | G16H 40/67 |
| 2018/0150609 | A1 * | 5/2018 | Kim | G06N 5/048 |
| 2019/0197128 | A1 * | 6/2019 | Martinez Iraola | G06F 16/3329 |
| 2019/0236102 | A1 * | 8/2019 | Wade | G06F 40/205 |
| 2019/0347269 | A1 * | 11/2019 | Xu | G06F 40/258 |
| 2019/0354582 | A1 * | 11/2019 | Schäfer | G06N 3/09 |
| 2019/0392209 | A1 * | 12/2019 | Tashiro | G06F 40/279 |
| 2020/0081975 | A1 * | 3/2020 | Yadav | G06F 16/355 |
| 2020/0111570 | A1 * | 4/2020 | Tran | G16H 50/20 |
| 2020/0211716 | A1 * | 7/2020 | Lefkofsky | G06F 18/214 |
| 2020/0387675 | A1 * | 12/2020 | Nugent | G06N 3/045 |
| 2021/0035661 | A1 * | 2/2021 | Neumann | G16H 20/00 |
| 2021/0295822 | A1 * | 9/2021 | Tomkins | G10L 15/197 |
| 2021/0365500 | A1 * | 11/2021 | Gunaselara | G06F 16/951 |
| 2022/0044826 | A1 * | 2/2022 | Schaeffer | G16H 50/70 |
| 2022/0253729 | A1 * | 8/2022 | Vashist | G06N 5/04 |
| 2022/0301671 | A1 * | 9/2022 | Trachtman | G16H 50/20 |
| 2022/0310264 | A1 * | 9/2022 | Kaput | G16H 20/10 |
| 2023/0091240 | A1 * | 3/2023 | Cohen | G16H 10/20 |
| | | | | 705/3 |
| 2023/0098783 | A1 * | 3/2023 | Zaremoodi | G06N 3/044 |
| | | | | 704/243 |
| 2023/0118171 | A1 * | 4/2023 | Agarwal | G06F 16/367 |
| | | | | 704/9 |
| 2023/0154627 | A1 * | 5/2023 | Irving | G06N 3/088 |
| | | | | 706/20 |
| 2023/0161978 | A1 * | 5/2023 | Sehanobish | G06N 3/09 |
| | | | | 704/9 |
| 2023/0197287 | A1 * | 6/2023 | Samadani | G16H 40/20 |
| | | | | 705/2 |
| 2023/0298590 | A1 * | 9/2023 | Thilges | G10L 15/26 |
| | | | | 704/235 |
| 2024/0046109 | A1 * | 2/2024 | Anand | G06N 5/01 |
| 2024/0079102 | A1 * | 3/2024 | Goravar | G16H 10/60 |
| 2024/0331815 | A1 * | 10/2024 | Kim | G06F 40/295 |
| 2025/0174366 | A1 * | 5/2025 | Grammer | C12Q 1/6883 |

OTHER PUBLICATIONS

Shah et al., "Biomedical Document Clustering and Visualization based on the Concepts of Diseases", ACM, arXiv:1810.09597v1, Oct. 2018, 8 pages.
Chowdhury et al., "Improving Medical NLI Using Context-Aware Domain Knowledge", Proceedings of the Ninth Joint Conference on Lexical and Computational Semantics, Dec. 12-13, 2020, pp. 1-11.
Yang et al., "Context-Aware Self-Attention Networks for Natural Language Processing", NeuroComputing, Jun. 13, 2021, 41 pages.
Patterson et al., "Document Clustering of Clinical Narratives: a Systematic Study of Clinical Sublanguages", AMIA Annual Symposium Proceedings, Oct. 22, 2011, pp. 1099-1107.
Chang et al., "A Context-Aware Approach for Progression Tracking of Medical Concepts in Electronic Medical Records", Journal of Biomedical Informatics, vol. 58, Dec. 2015, 21 pages.

* cited by examiner

COMPUTING DEVICE 101

RECEPTION COMPONENT 102

SEPARATION COMPONENT 104

TRAINING COMPONENT 106

CLASSIFICATION COMPONENT 108

INFERENCING COMPONENT 110

SEPARATION SCHEMA DATA 112

GROUPED MEDICAL REPORT DATA 114

MACHINE LEARNING (ML) MODEL DATA 116

124

MEMORY 118

PROCESSING UNIT 120

INPUT/OUTPUT DEVICES 122

MEDICAL REPORT DATA 126

MEDICAL DOMAIN KNOWLEDGE DATA 128

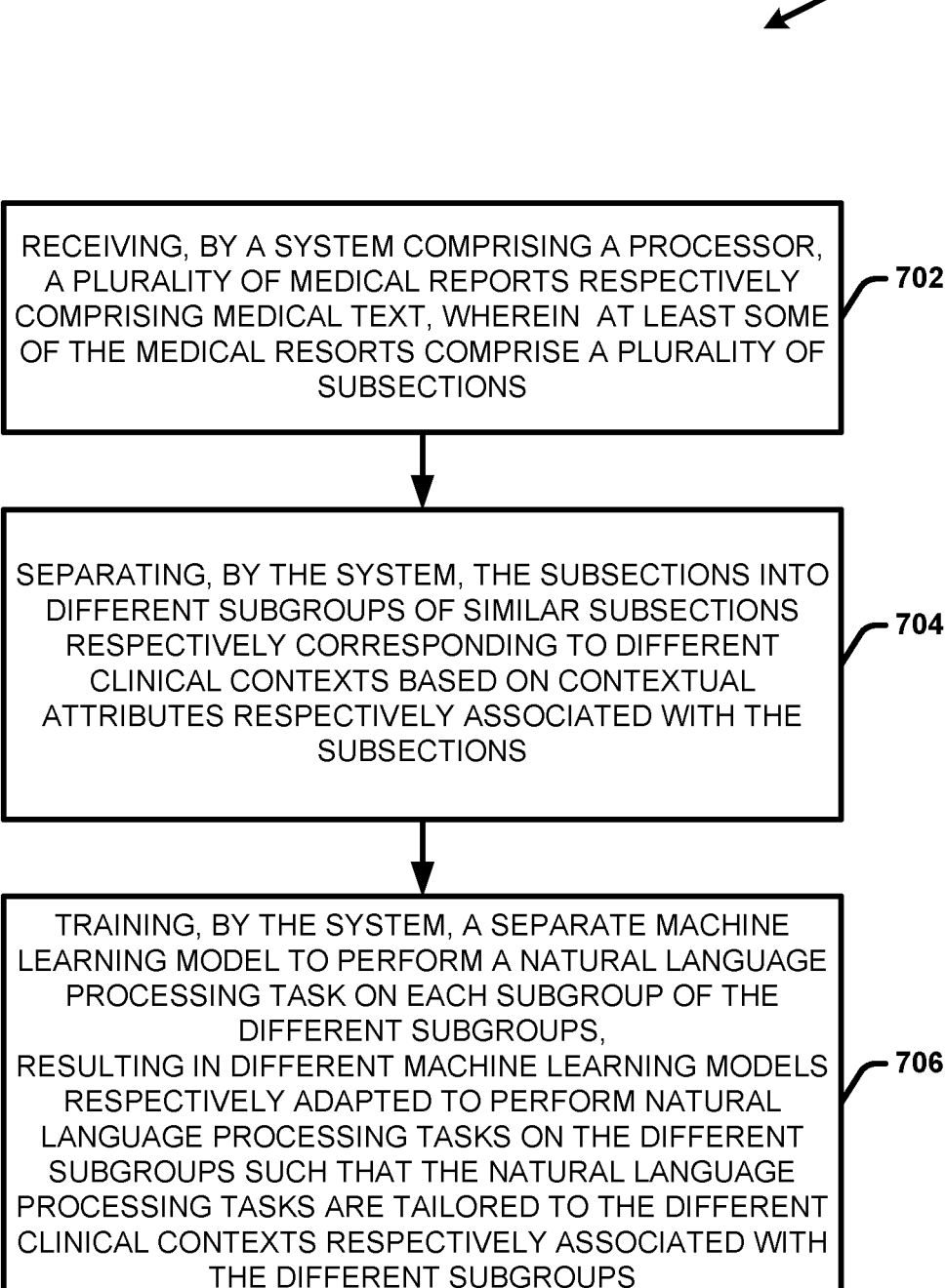

700

RECEIVING, BY A SYSTEM COMPRISING A PROCESSOR, A PLURALITY OF MEDICAL REPORTS RESPECTIVELY COMPRISING MEDICAL TEXT, WHEREIN AT LEAST SOME OF THE MEDICAL RESORTS COMPRISE A PLURALITY OF SUBSECTIONS

702

SEPARATING, BY THE SYSTEM, THE SUBSECTIONS INTO DIFFERENT SUBGROUPS OF SIMILAR SUBSECTIONS RESPECTIVELY CORRESPONDING TO DIFFERENT CLINICAL CONTEXTS BASED ON CONTEXTUAL ATTRIBUTES RESPECTIVELY ASSOCIATED WITH THE SUBSECTIONS

704

TRAINING, BY THE SYSTEM, A SEPARATE MACHINE LEARNING MODEL TO PERFORM A NATURAL LANGUAGE PROCESSING TASK ON EACH SUBGROUP OF THE DIFFERENT SUBGROUPS,
RESULTING IN DIFFERENT MACHINE LEARNING MODELS RESPECTIVELY ADAPTED TO PERFORM NATURAL LANGUAGE PROCESSING TASKS ON THE DIFFERENT SUBGROUPS SUCH THAT THE NATURAL LANGUAGE PROCESSING TASKS ARE TAILORED TO THE DIFFERENT CLINICAL CONTEXTS RESPECTIVELY ASSOCIATED WITH THE DIFFERENT SUBGROUPS

CLINICAL CONTEXT CENTRIC NATURAL LANGUAGE PROCESSING SOLUTIONS

TECHNICAL FIELD

This application relates to natural language processing (NLP) of medical text and more particularly to techniques for generating NLP solutions in the medical domain tailored based on clinical context.

BACKGROUND

Advancements in natural language processing (NLP), a branch of artificial intelligence that enables computers to understand written or spoken text, make it possible to extract insights from unstructured text. Using NLP methods, unstructured clinical text can be extracted, codified and stored in a structured format for downstream analysis and fed directly into machine learning (ML) models. These techniques are driving significant innovations in research and care.

However, NLP systems are typically not designed for healthcare. Clinical text is its own language. The data is inconsistent due to the wide variety of source systems (e.g., electronic health records (EHRs), clinical notes, different clinical reports) and the language varies greatly across clinical specialties. Traditional NLP technology is not built to understand the unique vocabularies, grammars and intents of medical text. As a result, NLP tools for automatically extracting meaningful interpretations from unstructured clinical data have been difficult to develop.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments, systems, computer-implemented methods, apparatus and/or computer program products are described for generating NLP solutions in the medical domain tailored based on clinical context.

According to an embodiment, a system is provided that comprises a memory that stores computer-executable components, and a processor that executes the computer-executable components stored in the memory. The computer-executable components comprise a reception component that receives a plurality of medical reports respectively comprising text data and a separation component that separates the medical reports into different groups of similar reports, the different groups respectively corresponding to different clinical contexts, based on contextual attributes associated with the medical reports. The computer-executable components further comprise a training component that trains a separate machine learning model to perform a NLP task on each group of the different groups of similar reports, resulting in different machine learning models adapted to perform NLP tasks on each of the different groups of reports such that the NLP tasks are tailored to the different clinical contexts respectively associated with the different groups of reports.

In some embodiments, elements described in connection with the disclosed systems can be embodied in different forms such as a computer-implemented method, a computer program product, or another form.

DESCRIPTION OF THE DRAWINGS

FIG. 7 illustrates a block diagram of another example, non-limiting computer implemented method for generating NLP solutions in the medical domain tailored based on clinical context in accordance with one or more embodiments of the disclosed subject matter.

DETAILED DESCRIPTION

Figure 1:
FIG. 1 illustrates an example, non-limiting system that facilitates generating NLP solutions in the medical domain tailored based on clinical context in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background section, Summary section or in the Detailed Description section.

The disclosed subject matter is directed to systems, computer-implemented methods, apparatus and/or computer program products that facilitate generating NLP solutions in the medical domain tailored based on clinical context in accordance with one or more embodiments of the disclosed subject matter. As noted in the Background section, traditional NLP technology is not adapted to understand the unique vocabularies, grammars and intents of medical text. Unstructured medical text is also inconsistent due to the wide variety of source systems (e.g., electronic health records (EHRs), clinical notes, clinical reports). In addition, there is significant variability amongst the unique vocabularies, grammars and intents of medical terms and phrases used in different clinical contexts. For example, many medical terms are homographs; words that are spelled the same but have different meanings in different clinical contexts, such as the term "cervical," which can mean either pertaining to the neck, as in cervical vertebra, or pertaining to the lowest segment of the uterus, such as the uterine cervix. As a result, NLP tools for automatically extracting meaningful interpretations from unstructured clinical data have been difficult to develop.

The disclosed techniques address this problem by providing techniques for efficiently generating a plurality of different NLP models tailored to different clinical contexts. To facilitate this end, the disclosed techniques utilize a separation engine (also referred to herein as a separation component) that automatically separates unstructured medical text included in various medical reports into different groups of training datasets respectively comprising medical reports and/or portions thereof corresponding to different clinical contexts. In this regard, each group of the different training datasets comprises a plurality of medical text samples (e.g., entire reports, portions or segments of the reports, etc.) having similar information pertaining to a distinct clinical context such that the terms and/or phrases have particular meanings and/or interpretations that are based on the distinct clinical context. For example, in some implementations, same or similar terms and/or phrases included in different medical reports associated with at least some of the different groups have different meanings relative to the different clinical contexts respectively associated with the different medical reports.

The different clinical contexts can be based on a variety of contextual attributes respectively associated with the medical reports and/or the portions thereof. In one or more embodiments, the contextual attributes can include but are not limited to: a medical report type of amongst a plurality of different types of medical reports (e.g., a pathology report type, a radiology report type, a laboratory report type, a treatment report type, etc.); a medical treatment type of a plurality of different types of medical treatment (e.g., chemotherapy, radiotherapy, surgery, etc.); a medical department of a plurality of different medical departments (e.g., radiology department, surgery department, recovery department, etc.); and a temporal stage of medical treatment of a plurality of different temporal stages of medical treatment (e.g., pre-surgery, post-surgery, chemotherapy phase I, chemotherapy phase II, etc.). Various additional contextual attributes are envisioned and described in greater detail infra.

Some or all of the contextual attributes used to separate the medical reports into different groups may be predefined and/or learned using machine learning techniques. In various embodiments, the separation engine can extract the contextual attributes from metadata respectively associated with the medical reports. The separation component can further employ domain knowledge information that correlates the contextual attributes with the different clinical contexts to facilitate identifying and extracting the relevant contextual attributes and separating the medical reports into the different groups. For example, the domain knowledge may include predefined medical ontologies and/or schema that identifies the different contextual attribute values corresponding to different clinical contexts associated with each attribute category, such as the different treatment types, and the elements of each treatment types.

In some embodiments, the at least some of the medical reports comprise a plurality of subsections and the separation engine separates the subsections into different subgroups of similar subsections respectively corresponding to different clinical contexts based on one or more contextual attributes respectively associated with the subsections. With these embodiments, the separation engine can group subsections having similar section headings or section titles together (e.g., findings sections, conclusion section, treatment section, etc.) for a same or similar type of report.

The disclosed techniques further involve training a separate machine learning model to perform a NLP task on each group of the different groups and/or subgroups of similar reports (i.e., each different training dataset), resulting in different machine learning models respectively adapted to perform NLP tasks on the different groups such that the NLP tasks are tailored to the different clinical contexts respectively associated with the different groups. The specific NLP task or tasks that the machine learning models are trained to perform can vary and be the same or different for the respective training datasets. For example, the NLP tasks can include but are not limited to: named entity recognition, named entity linking, classification, summarization, assertion status and relation extraction. In some embodiments, the specific NLP task applied to a particular training dataset can be selected based on the clinical context associated therewith such that the NLP task is tailored to the clinical context. For example, the NLP task used to processes the conclusion subsection of a radiology report may include a summarization task and the NLP task used to process the findings subsection of radiology report may include an named entity recognition task.

After the different NLP machine learning models have been trained and the specific contextual attributes used to group the medical text into the different subgroups has been learned and/or defined, the specific contextual attributes can be used to classify a new medical report and/or portions thereof as belonging to a particular group and/or subgroup corresponding to a particular clinical context. The corresponding trained NLP model for that particular clinical context can then be selected and applied to process the new medical report to generate a corresponding inference output.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIG. 1 illustrates a block diagram of an example, non-limiting system 100 that facilitates generating NLP solutions in the medical domain tailored based on clinical context in accordance with one or more embodiments of the disclosed subject matter. Embodiments of systems described herein can include one or more machine-executable components embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described.

For example, system 100 includes a computing device 101 that includes several computer-executable components, including reception component 102, separation component 104, training component 106, classification component 108 and inferencing component 110. These computer/machine executable components can be stored in memory associated with the one or more machines. The memory can further be operatively coupled to at least one processing unit such that the components can be executed by the at least one processing unit to perform the operations described. For example, in some embodiments, these computer/machine executable components can be stored in memory 118 of the computing device 101 which can be coupled to processing unit 120 for execution thereof. Examples of said and memory 118 and processing unit 120 as well as other suitable computer or computing-based elements, can be found with reference to FIG. 8, and can be used in connection with implementing one or more of the systems or components shown and described in connection with FIG. 1 or other figures disclosed herein.

Memory 118 can further store a variety of information that is received by, used by, and/or generated by the computing device 101 in association with generating NLP solutions in the medical domain tailored based on clinical context. This information can include separation schema data 112, grouped medical report data 114, and machine learning (ML) model data 116. The separation schema data 112 can include defined rules and/or schema that controls how the separation component 104 separates medical reports into different groups based on one or more contextual attributes associated with the medical reports. In some embodiments, some or all of the separation schema data 112 may be predefined prior to generation of the different training datasets corresponding to different clinical contexts. In other embodiments, some or all of the separation schema data 112 may be determined and defined by the separation component 104 in association with generating the different training datasets based on analysis of contextual attributes associated with the medical reports and utilization of medical domain knowledge data 128 that relates the contextual attributes to different clinical contexts. Such analysis can involve various machine learning and/or inferencing techniques, as described in greater detail below. The grouped medical report data 114 can include the different training datasets respectively comprising different groups of medical text samples corresponding to different clinical contexts that are generated by the separation component 104. The ML data 116 can include pretrained versions of the NLP models that the training component 106 trains on the respective training datasets as well as the trained versions of the NLP models.

The computing device 101 can further include one or more input/output devices 122 to facilitate receiving user input in association with generating NLP solutions in the medical domain tailored based on clinical context and rendering information to users in association with generating and/or applying the NLP models to new input medical text post training. In this regard, any information received by (e.g., medical report data 126 and/or portions thereof) and/or generated by (e.g., separation schema data 112, grouped medical report data 114, inference outputs generated by the trained NLP models etc.) the computing device 101 can be presented or rendered to a user via a output device, such as a display, a speaker or the like, depending on the data format. Suitable examples of the input/output devices 124 are described with reference to FIG. 8 (e.g., input devices 828 and output device 836). The computing device 101 can further include a device bus 124 that couples the memory 118, the processing unit 120 and the input/output devices 122 to one another.

System 100 further includes medical report data 126 and medical domain knowledge data 128. The medical report data 126 corresponds to a collection of various medical reports respectively comprising unstructured medical text for processing by the computing device 101. The medical reports can be stored in one or more databases that are communicatively coupled to the computing device 101 (e.g., either directly and/or via one or more wired or wireless communication networks). The medical reports can include a variety of different medical reports aggregated from different clinical systems and/or sources and encompass the various different clinical contexts distinguished by system 100. The term "medical report" is used herein to refer to any type of unstructured medical text. For example, the medical reports can include clinical reports, clinical notes, clinical orders, dictated clinical call logs, dictated clinical chat logs, patient electronic health records (EHRs), medical claims, medical emails, medical texts messages, digital forms and various other types of medical data.

The medical domain knowledge data 128 can include predefined medical ontologies and/or schema that that correlates relevant contextual attributes associated with the medical reports with different clinical contexts to facilitate separating the medical reports into the different groups. For example, the medical domain knowledge data 128 can include medical ontologies and/or schema (e.g., medical dictionaries, standardized medical ontologies, standardized medical coding schema, etc.) that defines medical terms and/or phrases and relationships between the terms and phrases as applicable to different clinical contexts. The medical domain knowledge data 128 can be stored in one or more databases that are communicatively coupled to the computing device 101 (e.g., either directly and/or via one or more wired or wireless communication networks).

Figure 2:
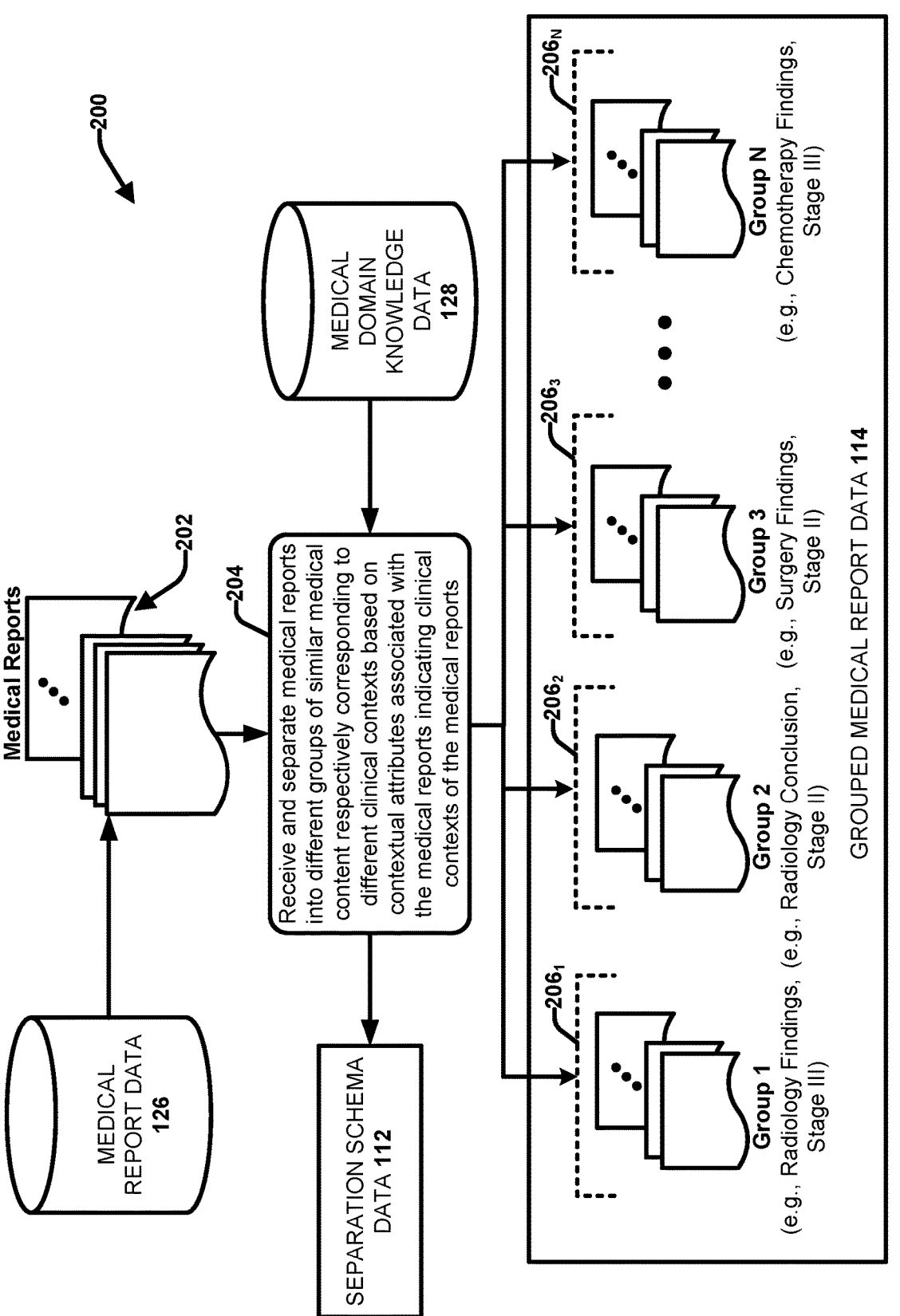
FIG. 2 presents a flow diagram of an example high-level process for separating medical reports into different groups in accordance with one or more embodiments of the disclosed subject matter.

FIG. 2 presents a flow diagram of an example high-level process 200 for separating medical reports into different groups in accordance with one or more embodiments of the disclosed subject matter. With reference to FIGS. 1 and 2, process 200 corresponds to an example process that can be performed by the computing device 101 using reception component 102 and separation component 104.

In accordance with various embodiments and process 200, the reception component 102 can receive a plurality of medical reports 202 as included in the medical reports data 126 respectively comprising medical text. The number medical reports 202 received can vary yet preferably includes hundreds of reports and even more preferably thousands of reports or more. As noted above, the medical reports can include a variety of different types of medical reports including unstructured medical text. In one or more embodiments, the different types of medical reports include, but are not limited to: a patient history and physical report, a patient consultation report, an operative/surgery report, a treatment report (e.g., accounting for different types of treatment performed for different types of medical conditions, such as different forms of treatment for oncology patients which may include surgery, chemotherapy, radiotherapy, etc.), a discharge summary report, a radiology report, a pathology report, and a laboratory report. It should be appreciated that the above noted types of medical reports are merely exemplary and that various other predefined types of medical reports are envisioned.

At 202, the separation component 104 receives and separates the medical reports into different groups of similar medical content respectively corresponding to different clinical contexts based on contextual attributes associated with the medical reports indicating clinical contexts of the medical reports. The different separated groups of medical reports are represented in process 200 as groups $206_{1-N}$ respectively, wherein the number N of the different groups can vary and wherein the collective groups are referred to as the grouped medical report data 114. In this regard, each group of the different groups $206_{1-N}$ can include a plurality of medical text samples having similar information pertaining to a distinct clinical context such that the terms and/or phrases have particular meanings and/or interpretations that are based on the distinct clinical context. For example, in some implementations, same or similar terms and/or phrases included in different medical reports associated with at least some of the different groups have different meanings relative to the different clinical contexts respectively associated with the different medical reports. The medical text samples included in some or all of the different groups $206_{1-N}$ can include entire reports and/or portions or segments of the reports corresponding to different subsections, depending on the type of the report and the separation criteria employed (e.g., as defined in the separation schema data 112.

In this regard, the different clinical contexts can be based on a variety of contextual attributes respectively associated with the medical reports and/or the portions thereof. In one or more embodiments, the contextual attributes can include but are not limited to: a medical report type of amongst a plurality of different types of medical reports (e.g., a pathology report type, a radiology report type, a laboratory report type, a treatment report type, a procedure report type, etc.); a medical treatment type of a plurality of different types of medical treatment (e.g., chemotherapy, radiotherapy, surgery, etc.); a medical department of a plurality of different medical departments (e.g., radiology department, surgery department, recovery department, etc.); and a temporal stage of medical treatment of a plurality of different temporal stages of medical treatment (e.g., pre-surgery, post-surgery, chemotherapy phase I, chemotherapy phase II, etc.). Various additional contextual attributes are envisioned. For example, some additional contextual attributes that may be used to group medical text data can further include, but are not limited to: procedure type of a plurality of different procedures types, medical diagnosis of a plurality of different medical diagnosis, anatomical region involved of a plurality of different anatomical regions, and report source of a plurality of different sources of the medical reports.

Some or all of the separation criteria (i.e., the separation schema data 112) used by the separation component 104 to separate the medical reports 202 into different groups may be predefined and/or learned using machine learning techniques. In various embodiments, the separation component 104 can extract the contextual attributes from metadata respectively associated with the medical reports. For example, each of the medical reports 202 can have metadata associated therewith that identifies or indicates the type of the report, the type of medical treatment, one or more elements of the type of medical treatment, the medical department associated with the report, the temporal phase or stage of the medical treatment described, the different sections or subsections included in the report, the procedure type, the medical diagnosis, the anatomical region involved, and/or the report source. The separation component 104 can further employ domain knowledge data 128 that correlates the contextual attributes with the different clinical contexts to facilitate identifying and extracting the relevant contextual attributes and separating the medical reports into the different groups. For example, the domain knowledge may include predefined medical ontologies and/or schema that identifies the different contextual attribute values corresponding to different clinical contexts associated with each attribute category, such as the different report types, the different treatment types, and the elements of each treatment types, the different medical department types, and the different temporal stages of medical treatment.

In this regard, the separation component 104 can use a combination of contextual attributes respectively extracted from metadata associated with the reports and medical domain knowledge data 128 to facilitate separating the medical reports into different groups corresponding to different clinical contexts. This technique is different from traditional data clustering techniques used in NLP which involve representing documents or reports as vectors using mathematical vector representations of the collections of terms/words included in the text documents and further clusters similar text documents together based on similarities and differences between their respective vectors. These traditional clustering techniques do not capture the relevant clinical context when applied to clustering medical reports.

In some embodiments, the separation schema data 112 can include predefined separation criteria for separating the medical reports 202 into the different groups $206_{1-N}$ based on one or more defined contextual attributes. In various implementations of these embodiments, the one or more defined contextual attributes can include report type, treatment type, medical department, and temporal phase of treatment. The separation component 104 can further employ the medical domain knowledge data 128 to identify the different values of these contextual attributes (e.g., the different report types, the different treatment types, the different medical department types and the different temporal phases of treatment) that can be extracted from metadata respectively associated with the respective medical reports. The separation component 104 can further group reports having same or similar contextual attributes together. In some implementations of these embodiments, the separation schema 112 can instruct the separation component 104 to initially group medical reports of the same type together. The separation schema 112 can further instruct the separation component 102 to break down each report type grouping into additional subgroups based on one or more additional contextual attributes selected from the group consisting of treatment type, medical department, and temporal phase of treatment. The level of granularity used by the separation component 104 to generate the different groups or subgroups of reports can vary.

Additionally, or alternatively, the separation schema 112 can instruct the separation component 104 to initially group medical reports of the same type together and/or medical reports associated with the same type of treatment together and/or medical reports of the same temporal phase of treatment together. For instance, as applied to oncology patients, there is a large variance in reports over the patient history depending on the phase of treatment and the type of treatment (e.g., pre-detection, during treatment (including different phases of treatment such as phase I, phase II, phase III etc. and different types of treatment including surgery, chemotherapy and radiotherapy).

The separation schema 112 can further instruct the separation component 102 to break down the medical reports into subsections and group similar subsections together in embodiments in which at least some of the medical reports include different subsections, as exemplified in FIG. 2. With these embodiments, the separation component 104 can identify the different subsections based on respective subsection titles or headings included in metadata respectively associated with the medical reports and further defined for different types of reports as provided in the medical domain knowledge 128. For instance, some example subsection headings that are included in radiology reports, surgery reports and chemotherapy reports include a "findings" section and a "conclusion" section, among others. According to this example, the separation component 104 can break any report having different subsections and group similar subsections together in a separate groups for the same report type. The reparation component 104 can further separate the grouped subsections based on additional separation criteria, such as treatment stage (e.g., as applied to oncology patients or the like and as exemplified in FIG. 2) and/or other defined clinical/contextual criteria, which can vary for different types of reports and/or treatment types.

It should be appreciated that the level of granularity applied by the separation component 104 in association with breaking down the medical reports into different groups respectively having similar clinical content will depend on the available metadata that is respectively associated with the medical reports, the learned and/or predefined contextual attributes included in the separation schema data 112, and the number of different values (e.g., number of different report types, number of different treatment types, number different departments, number of different treatment phases, etc.) for the different contextual attributes as predefined or learned based on analysis of the medical domain knowledge data 128.

Figure 3:
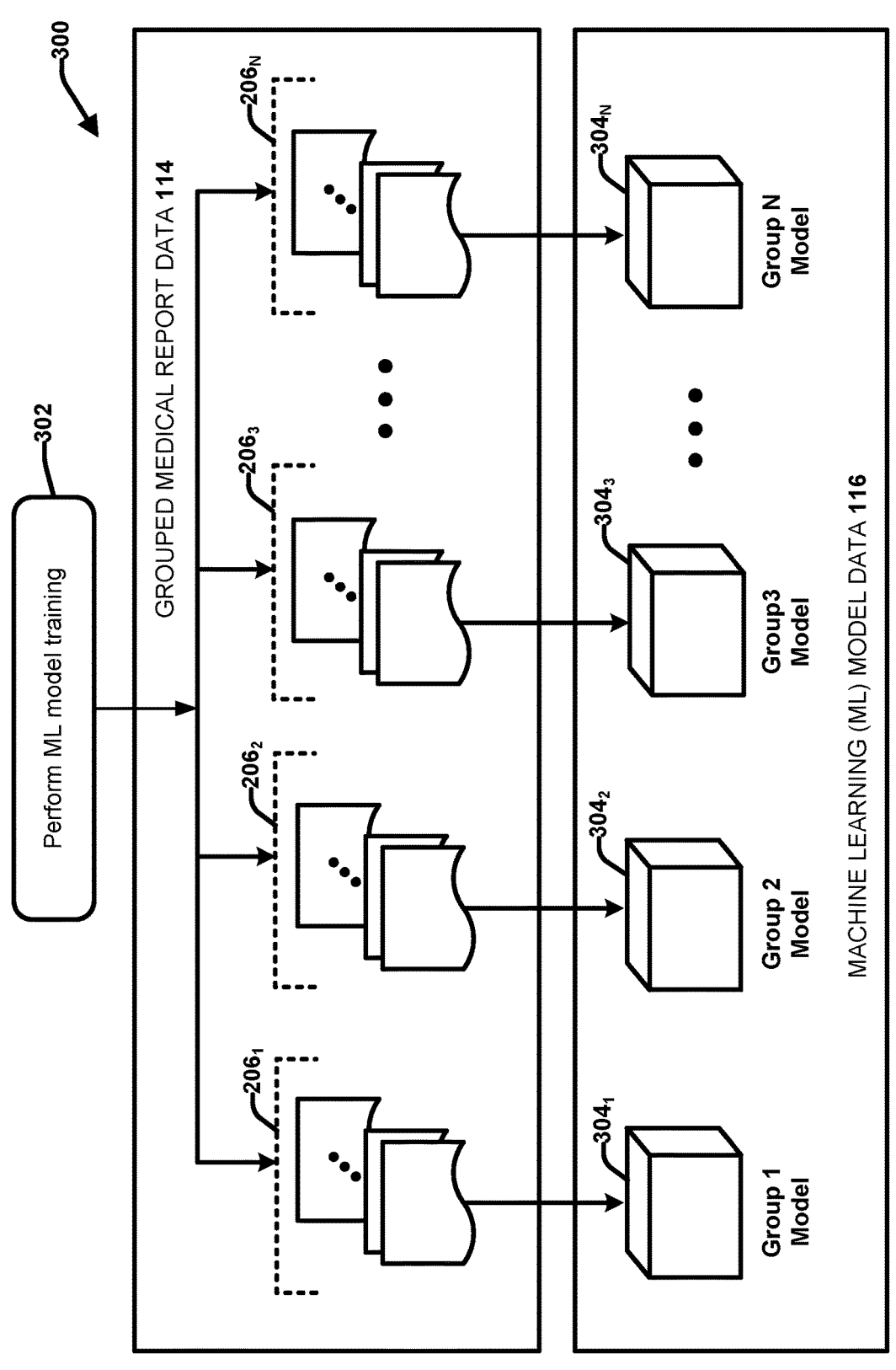
FIG. 3 presents a flow diagram of an example high-level process for generating different machine learning models tailored to perform a NLP task on different types of medical content in accordance with one or more embodiments of the disclosed subject matter.

FIG. 3 presents a flow diagram of an example high-level process 300 for generating different machine learning models tailored to perform a NLP task on different types of medical content in accordance with one or more embodiments of the disclosed subject matter. With reference to FIGS. 1 and 3, process 200 corresponds to an example process that can be performed by the computing device 101 via the training component 106.

In accordance with various embodiments and process 300, at 302, the training component performs the ML model training. In this regard, the training component 302 separately a separate ML model to perform a natural language processing task on each group of the different groups $206_{1-N}$ reports (e.g., each distinct group of reports corresponds to a distinct ML model training dataset), resulting in different ML models $304_{1-N}$ respectively adapted to perform NLP tasks on the different groups such that the NLP tasks are tailored to the different clinical contexts respectively associated with the different groups. Accordingly, rather than training a single ML model to perform an NLP on many different types of medical test reports corresponding to different clinical contexts (e.g., wherein the clinical contexts account for different types of reports, different treatment types, different medical departments, different temporal phases of treatment, and various other contextual attributes discussed herein) and requiring the single ML model to learn and discern between how the various clinical attributes influence interpretation of different medical terms and phrases, the clinical context associated with each training dataset is independently known and accounted for. As a result, each of the different ML models $304_{1-N}$ are trained to account for a specific clinical context and apply a tailored or targeted interpretation of the medical terms and phrases included in the input data based on that specific clinical context. In this regard, each of the different groups $206_{1-N}$ contain medical text samples that relate to a unique clinical context such that the meaning and relationships between the terms and phrases included in the medical text samples is interpreted by the corresponding ML model based on the unique clinical context and/or such that the relevant terms and/or phrases that are processed and/or extracted by corresponding ML model are selected based on the unique clinical context.

The specific NLP task or tasks that the machine learning models are trained to perform can vary and be the same or different for the respective training datasets. For example, the NLP tasks can include but are not limited to: named entity recognition, named entity linking, classification, text summarization, assertion status, relation extraction, sentiment analysis, and machine translation. In some embodiments, the specific NLP task applied to a particular group of reports can be selected based on the clinical context associated therewith such that the NLP task is tailored to the clinical context. For example, the NLP task used to processes the conclusion subsection of a radiology report may include a summarization task and the NLP task used to process the findings subsection of radiology report may include an named entity recognition task. In this regard, the particular type or types of the respective ML models $304_{1-N}$ can vary. Some example types of NLP models that the ML models $304_{1-N}$ may correspond to can include, but are not limited to: one or more transformer models, such as bidirectional encoder representations from transforms (BERT) models, and other types of deep learning models utilizing recurrent neural networks (RNNs) and/or convolutional neural networks (CNNs).

Depending on the type of the ML models $304_{1-N}$, the training component 106 can employ conventional supervised, semi-supervised, and/or unsupervised machine learning techniques to train the corresponding models as stored in the machine learning model data 116. In some embodiments, the contextual metadata attributes associated with each report as extracted by the separation component 104 during the separation and grouping process can be utilized as input features for the respective models.

After the different NLP machine learning models have been trained and the specific contextual attributes used to group the medical text into the different subgroups has been learned and/or defined in the separation schema data 112, the specific contextual attributes can be used by the classification component to classify a new medical report and/or portions thereof as belonging to a particular group and/or subgroup corresponding to a particular clinical context. The inferencing component 110 can then select and apply the corresponding trained NLP model (e.g., of the ML models $304_{1-N}$) models for that particular to process the new medical report to generate a corresponding inference output (e.g., which can vary depending on the particular NLP task that the model is adapted to perform), as illustrated in FIG. 4.

Figure 4:
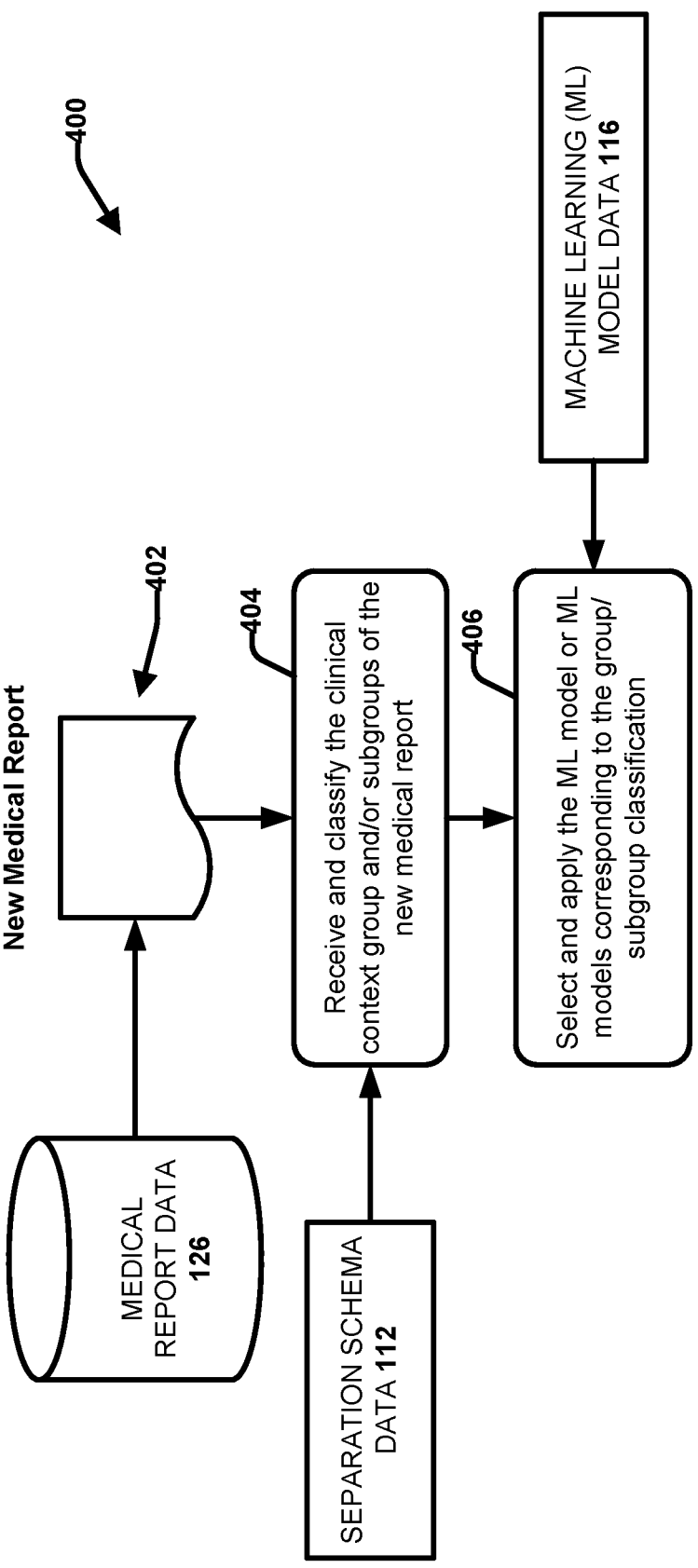
FIG. 4 presents a flow diagram of an example high-level process for tailoring a NLP solution based on the clinical context associated with the input data in accordance with one or more embodiments of the disclosed subject matter.

In this regard, FIG. 4 presents a flow diagram of an example high-level process 400 for tailoring a NLP solution based on the clinical context associated with the input data in accordance with one or more embodiments of the disclosed subject matter. With reference to FIGS. 1 and 4, process 400 corresponds to an example process that can be performed by the computing device 101 using reception component 102, classification component 108 and inferencing component 110.

In accordance with various embodiments and process 400, at 404, the reception component 102 can receive a new medical report 402 (e.g., extracted from the medical report data 126 or another suitable source of medical reports) and the classification component 108 can classify the clinical context group and/or subgroups of the new medical report 402. To facilitate this end, the classification component 108 can function in a same or similar manner as the separation component 104. For example, the classification component 108 can identify and/or extract the contextual attributes associated with the new medical report 402 (e.g., in metadata) and determine the specific group of groups $206_{1-N}$ that the new medical report belongs to as defined in the separation schema data 112 based on the specific values of the contextual attributes associated therewith. In some embodiments in which the new medical report contains different subsections and wherein the separation schema data 112 defines one or more of the different subsections as constituting a distinct subgroup corresponding to a distinct clinical context, at 404, the separation component 106 can further separate the new medical report text into the one or more different subsections and classify the specific group (or subgroup) of the different groups 206$_{1-N}$ text into that each of the one or more subsections belongs to. At 406, the inferencing component 108 can further select and apply the ML model or ML models (e.g., of the ML models 304$_{1-N}$, as provided in the ML model data 116) corresponding to the group and/or subgroup classification to the new medical report and/or the respective subsections (e.g., where applicable).

Figure 5:
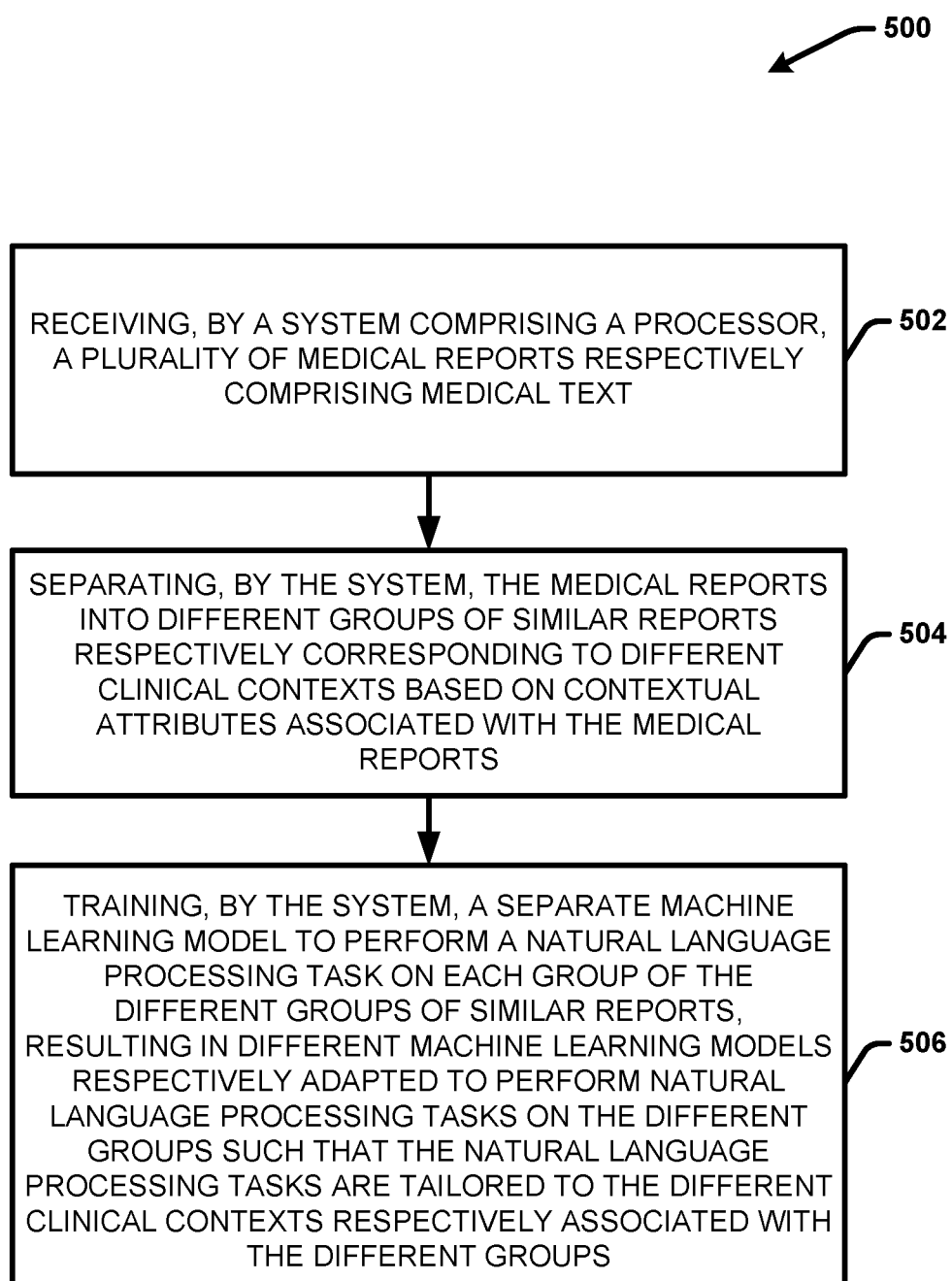
FIG. 5 illustrates a block diagram of an example, non-limiting computer implemented method for generating NLP solutions in the medical domain tailored based on clinical context in accordance with one or more embodiments of the disclosed subject matter.

FIG. 5 illustrates a block diagram of an example, non-limiting computer implemented method 500 for generating NLP solutions in the medical domain tailored based on clinical context in accordance with one or more embodiments of the disclosed subject matter.

At 502, method 500 comprises receiving, by a system comprising a processor (e.g., system 100 or the like, via reception component 102), a plurality of medical reports respectively comprising medical text (e.g., generally unstructured medical text). At 504, method 500 further comprises separating, by the system (e.g., via separation component 104), the medical reports into different groups of similar reports respectively corresponding to different clinical contexts based on contextual attributes associated with the medical reports. At 506, method 500 further comprises training, by the system (e.g., via training component 106), a separate machine learning model to perform a NLP task on each group of the different groups of similar reports, resulting in different machine learning models respectively adapted to perform NLP tasks on the different groups such that the NLP tasks are tailored to the different clinical contexts respectively associated with the different groups.

Figure 6:
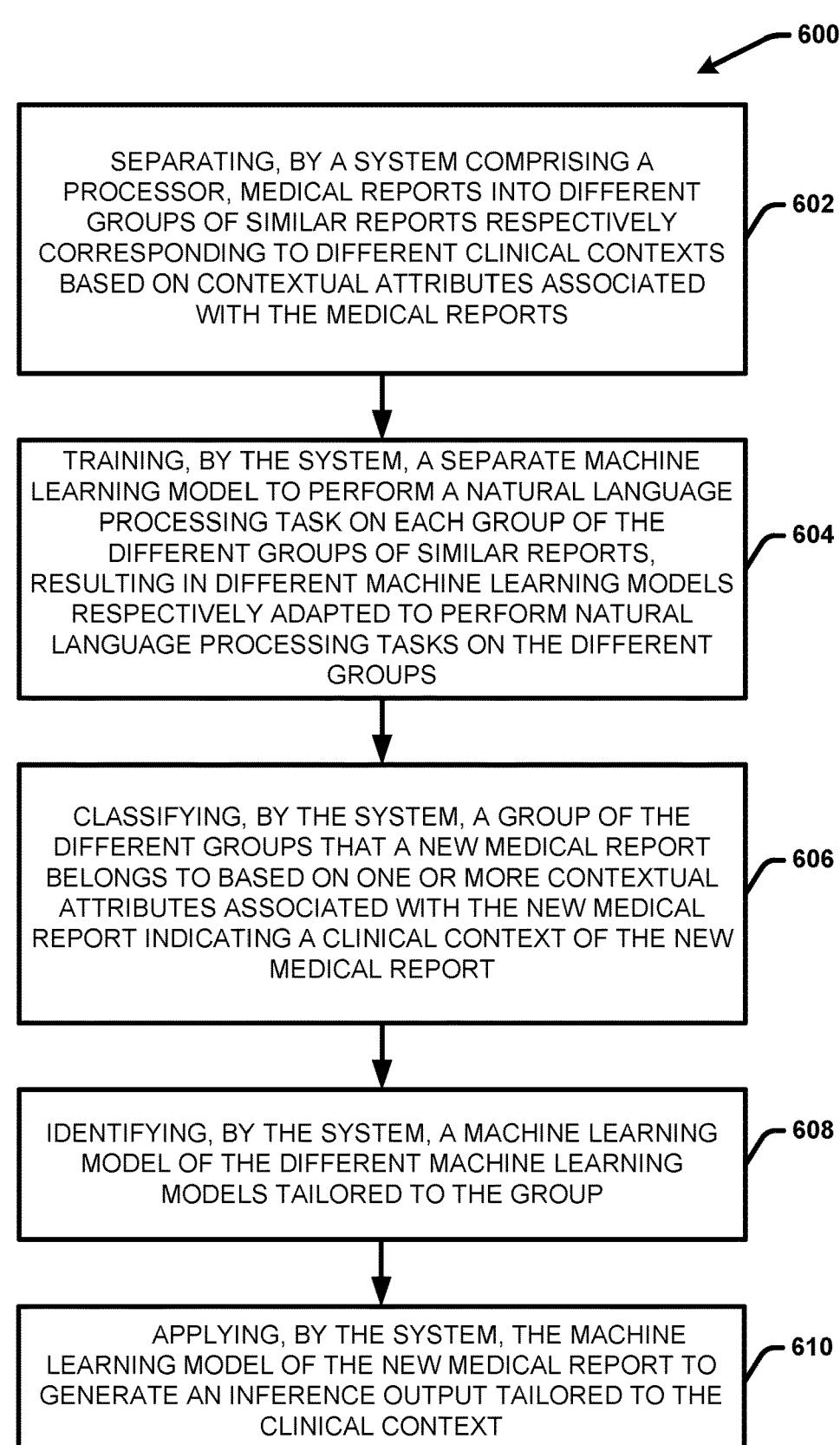
FIG. 6 illustrates a block diagram of another example, non-limiting computer implemented method for generating NLP solutions in the medical domain tailored based on clinical context in accordance with one or more embodiments of the disclosed subject matter.

FIG. 6 illustrates a block diagram of another example, non-limiting computer implemented method 600 for generating NLP solutions in the medical domain tailored based on clinical context in accordance with one or more embodiments of the disclosed subject matter.

At 602, method 600 comprises separating, by a system comprising a processor (e.g., system 100 or the like, via separation component 104), medical reports into different groups of similar reports respectively corresponding to different clinical contexts based on contextual attributes associated with the medical reports. At 604, method 600 further comprises training, by the system (e.g., via training component 106), a separate machine learning model to perform a NLP task on each group of the different groups of similar reports, resulting in different machine learning models respectively adapted to perform NLP tasks on the different groups such that the NLP tasks are tailored to the different clinical contexts respectively associated with the different groups. At 606 method 600 further comprises classifying, by the system (e.g., via classification component 108), a group of the different groups that a new medical report belongs to based on one or more contextual attributes associated with the new medical report indicating a clinical context of the new medical report. At 608, method 600 further comprises identifying, by the system (e.g., via inferencing component 110), a machine learning model of the different machine learning models tailored to the group, and at 610, method 600 comprises applying, by the system (e.g., via inferencing component 110), the machine learning model of the new medical report to generate an inference output tailored to the clinical context.

FIG. 7 illustrates a block diagram of another example, non-limiting computer implemented method 700 for generating NLP solutions in the medical domain tailored based on clinical context in accordance with one or more embodiments of the disclosed subject matter.

At 702, method 700 comprises receiving, by a system comprising a processor (e.g., system 100 or the like, via reception component 102), a plurality of medical reports respectively comprising medical text (e.g., generally unstructured medical text), wherein at least some of the medical reports comprise a plurality of subsections. At 704, method 700 further comprises separating, by the system (e.g., via separation component 104), the subsections into different subgroups of similar subsections respectively corresponding to different clinical contexts based on contextual attributes respectively associated with the subsections (e.g., section title/headers and other contextual attributes such as report type, treatment type, temporal phase of treatment, etc.). At 706, method 700 further comprises training, by the system (e.g., via training component 106), a separate machine learning model to perform a NLP task on each subgroup of the different subgroups, resulting in different machine learning models respectively adapted to perform NLP tasks on the different groups such that the NLP tasks are tailored to the different clinical contexts respectively associated with the different subgroups.

One or more embodiments of the disclosed subject matter can be a system, a method, and/or a computer program product at any possible technical detail level of integration. The computer program product can include a computer readable storage medium (or media) having computer readable program instructions thereon for causing a processor to carry out one or more aspects of the present embodiments.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, procedural programming languages, such as the "C" programming language or similar programming languages, and machine-learning programming languages such as like CUDA, Python, Tensorflow, PyTorch, and the like. The computer readable program instructions can execute entirely on the user's computer, partly on the user's computer, as a stand-alone software package, partly on the user's computer and partly on a remote computer or entirely on the remote computer or server using suitable processing hardware. In the latter scenario, the remote computer can be connected to the user's computer through any type of network, including a local area network (LAN) or a wide area network (WAN), or the connection can be made to an external computer (for example, through the Internet using an Internet Service Provider). In various embodiments involving machine-learning programming instructions, the processing hardware can include one or more graphics processing units (GPUs), central processing units (CPUs), and the like. For example, one or more inferencing models (e.g., multi-task inferencing models, sub-models, or components thereof) may be written in a suitable machine-learning programming language and executed via one or more GPUs, CPUs or combinations thereof. In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 8, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 8:
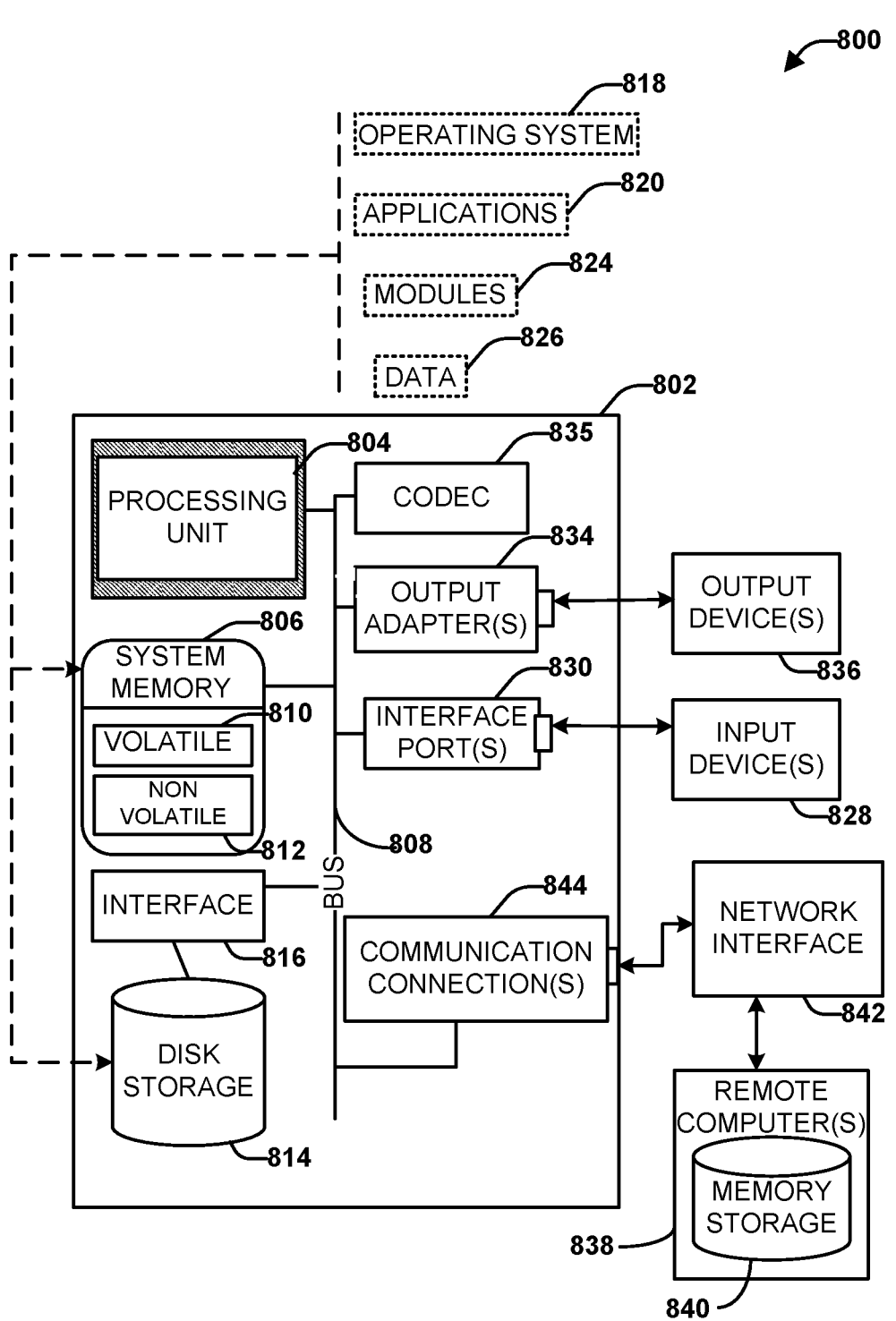
FIG. 8 illustrates a block diagram of an example, non-limiting operating environment in which one or more embodiments described herein can be facilitated.

With reference to FIG. 8, an example environment 800 for implementing various aspects of the claimed subject matter includes a computer 802. The computer 802 includes a processing unit 804, a system memory 806, a codec 835, and a system bus 808. The system bus 808 couples system components including, but not limited to, the system memory 806 to the processing unit 804. The processing unit 804 can be any of various available processors. Dual microprocessors and other multiprocessor architectures also can be employed as the processing unit 804.

The system bus 808 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1384), and Small Computer Systems Interface (SCSI).

The system memory 806 includes volatile memory 810 and non-volatile memory 812, which can employ one or more of the disclosed memory architectures, in various embodiments. The basic input/output system (BIOS), containing the basic routines to transfer information between elements within the computer 802, such as during start-up, is stored in non-volatile memory 812. In addition, according to present innovations, codec 835 can include at least one of an encoder or decoder, wherein the at least one of an encoder or decoder can consist of hardware, software, or a combination of hardware and software. Although, codec 835 is depicted as a separate component, codec 835 can be contained within non-volatile memory 812. By way of illustration, and not limitation, non-volatile memory 812 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 812 can employ one or more of the disclosed memory devices, in at least some embodiments. Moreover, non-volatile memory 812 can be computer memory (e.g., physically integrated with computer 802 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 810 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 802 can also include removable/non-removable, volatile/non-volatile computer storage medium. FIG. 8 illustrates, for example, disk storage 814. Disk storage 814 includes, but is not limited to, devices like a magnetic disk drive, solid state disk (SSD), flash memory card, or memory stick. In addition, disk storage 814 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 814 to the system bus 808, a removable or non-removable interface is typically used, such as interface 816. It is appreciated that disk storage 814 can store information related to an entity. Such information might be stored at or provided to a server or to an application running on an entity device. In one embodiment, the entity can be notified (e.g., by way of output device(s) 836) of the types of information that are stored to disk storage 814 or transmitted to the server or application. The entity can be provided the opportunity to opt-in or opt-out of having such information collected or shared with the server or application (e.g., by way of input from input device(s) 828).

It is to be appreciated that FIG. 8 describes software that acts as an intermediary between entities and the basic computer resources described in the suitable operating environment 800. Such software includes an operating system 818. Operating system 818, which can be stored on disk storage 814, acts to control and allocate resources of the computer system 802. Applications 820 take advantage of the management of resources by operating system 818 through program modules 824, and program data 826, such as the boot/shutdown transaction table and the like, stored either in system memory 806 or on disk storage 814. It is to be appreciated that the claimed subject matter can be implemented with various operating systems or combinations of operating systems.

An entity enters commands or information into the computer 802 through input device(s) 828. Input devices 828 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 804 through the system bus 808 via interface port(s) 830. Interface port(s) 830 include, for example, a serial port, a parallel port, a game port, and a universal serial bus (USB). Output device(s) 836 use some of the same type of ports as input device(s) 828. Thus, for example, a USB port can be used to provide input to computer 802 and to output information from computer 802 to an output device 836. Output adapter 834 is provided to illustrate that there are some output devices 836 like monitors, speakers, and printers, among other output devices 836, which require special adapters. The output adapters 834 include, by way of illustration and not limitation, video and sound cards that provide a means of connection between the output device 836 and the system bus 808. It should be noted that other devices or systems of devices provide both input and output capabilities such as remote computer(s) 838.

Computer 802 can operate in a networked environment using logical connections to one or more remote computers, such as remote computer(s) 838. The remote computer(s) 838 can be a personal computer, a server, a router, a network PC, a workstation, a microprocessor based appliance, a peer device, a smart phone, a tablet, or other network node, and typically includes many of the elements described relative to computer 802. For purposes of brevity, only a memory storage device 840 is illustrated with remote computer(s) 838. Remote computer(s) 838 is logically connected to computer 802 through a network interface 842 and then connected via communication connection(s) 844. Network interface 842 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 844 refers to the hardware/software employed to connect the network interface 842 to the bus 808. While communication connection 844 is shown for illustrative clarity inside computer 802, it can also be external to computer 802. The hardware/software necessary for connection to the network interface 842 includes, for exemplary purposes only, internal and external technologies such as, modems including regular telephone grade modems, cable modems and DSL modems, ISDN adapters, and wired and wireless Ethernet cards, hubs, and routers.

The illustrated aspects of the disclosure may also be practiced in distributed computing environments where certain tasks are performed by remote processing devices that are linked through a communications network. In a distributed computing environment, program modules can be located in both local and remote memory storage devices.

Figure 9:
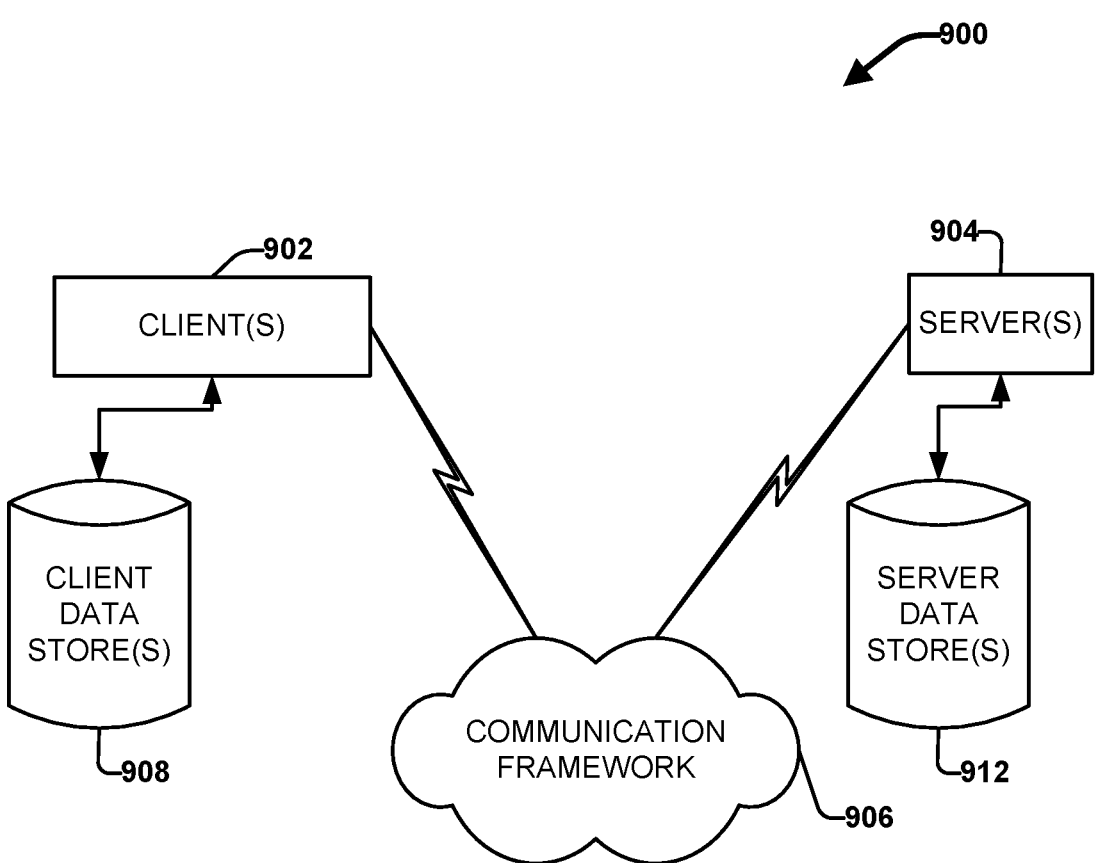
FIG. 9 illustrates a block diagram of another example, non-limiting operating environment in which one or more embodiments described herein can be facilitated.

Referring to FIG. 9, there is illustrated a schematic block diagram of a computing environment 900 in accordance with this disclosure in which the subject system (e.g., system 100 and the like), methods and computer readable media can be deployed. The computing environment 900 includes one or more client(s) 902 (e.g., laptops, smart phones, PDAs, media players, computers, portable electronic devices, tablets, and the like). The client(s) 902 can be hardware and/or software (e.g., threads, processes, computing devices). The computing environment 900 also includes one or more server(s) 904. The server(s) 904 can also be hardware or hardware in combination with software (e.g., threads, processes, computing devices). The servers 904 can house threads to perform transformations by employing aspects of this disclosure, for example. In various embodiments, one or more components, devices, systems, or subsystems of system 100 can be deployed as hardware and/or software at a client 902 and/or as hardware and/or software deployed at a server 904. One possible communication between a client 902 and a server 904 can be in the form of a data packet transmitted between two or more computer processes wherein the data packet may include healthcare related data, training data, ML models, input data for the ML models, encrypted output data generated by the ML models, and the like. The data packet can include a metadata, e.g., associated contextual information, for example. The computing environment 900 includes a communication framework 906 (e.g., a global communication network such as the Internet, or mobile network(s)) that can be employed to facilitate communications between the client(s) 902 and the server(s) 904.

Communications can be facilitated via a wired (including optical fiber) and/or wireless technology. The client(s) 902 include or are operatively connected to one or more client data store(s) 908 that can be employed to store information local to the client(s) 902. Similarly, the server(s) 904 are operatively include or are operatively connected to one or more server data store(s) 912 that can be employed to store information local to the servers 904.

In one embodiment, a client 902 can transfer an encoded file, in accordance with the disclosed subject matter, to server 904. Server 904 can store the file, decode the file, or transmit the file to another client 902. It is to be appreciated, that a client 902 can also transfer uncompressed file to a server 904 can compress the file in accordance with the disclosed subject matter. Likewise, server 904 can encode video information and transmit the information via communication framework 906 to one or more clients 902.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "subsystem" "platform," "layer," "gateway," "interface," "service," "application," "device," and the like, can refer to and/or can include one or more computer-related entities or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of entity equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer-executable components; and
a processor that executes the computer-executable components stored in the memory, wherein the computer-executable components comprise:
  a reception component that receives a plurality of medical reports respectively comprising medical text;
  a separation component that separates the medical text into different text groups respectively corresponding to different clinical contexts based on contextual attributes associated with the medical text, wherein the separation component extracts the contextual attributes from metadata respectively associated with the medical text and further employs domain knowledge information that correlates the contextual attributes with the different clinical contexts to facilitate separating the medical text into the different text groups; and
  a training component that trains a separate machine learning model to perform a natural language processing task on each group of the different text groups, resulting in different machine learning models respectively adapted to perform the natural language processing task on the different text groups such that each model of the different machine learning models is tailored to a different clinical context, wherein the natural language processing task involves determining meanings of at least some words and phrases included in the different text groups, and wherein at least some of the meanings vary based on the different clinical contexts.

2. The system of claim 1, wherein the computer-executable components further comprise:
  a classification component that classifies a text group of the different text groups that new medical text belongs to based on one or more contextual attributes associated with the new medical text indicating a clinical context of the new medical text; and
  an inferencing component identifies a machine learning model of the different machine learning models tailored to the text group and applies the machine learning model to the new medical text to generate an inference output tailored to the clinical context.

3. The system of claim 1, wherein the at least some of the different text groups correspond to different subsections of at least some of the medical reports.

4. The system of claim 3, wherein the contextual attributes indicate the different subsections.

5. The system of claim 1, wherein the contextual attributes relate to a medical treatment type of a plurality of different types of medical treatment.

6. The system of claim 1, wherein the contextual attributes relate to a medical department of a plurality of different medical departments.

7. The system of claim 1, wherein the contextual attributes relate to a temporal stage of medical treatment of a plurality of different temporal stages of medical treatment.

8. The system of claim 1, wherein same or similar terms included in at least some of the different text groups have different meanings relative to corresponding clinical contexts associated with the at least some of the different text groups.

9. The system of claim 1, wherein the at least some of the different text groups correspond to different subsections of at least some of the medical reports.

10. The system of claim 1, wherein the contextual attributes relate to at least one of:

a type of the medical reports of amongst a plurality of different types of medical reports, a medical treatment type of a plurality of different types of medical treatment, a medical department of a plurality of different medical departments, or a temporal stage of medical treatment of a plurality of different temporal stages of medical treatment.

11. The system of claim 1, wherein the natural language processing task comprises named entity recognition.

12. The system of claim 1, wherein each of the different text groups comprises a plurality of text samples extracted from two or more different reports of the plurality of medical reports.

13. The system of claim 12, wherein the contextual attributes include: report type of among different report types identified in the domain knowledge information, treatment type of among different treatment types identified in the domain knowledge information, medical department type of among different medical department types identified in the domain knowledge information, and temporal phase of treatment of among different temporal treatment phases identified in the domain knowledge information.

14. The system of claim 1, wherein the domain knowledge information includes one or more medical ontologies that define medical terms and phrases and relationships between the medical terms and phrases as applicable to different clinical contexts.

15. A method, comprising:

receiving, by a system comprising a processor, a plurality of medical reports respectively comprising medical text;

extracting, by the system, contextual attributes associated with the medical text from metadata respectively associated with the medical text;

separating, by the system, the medical text into different text groups respectively corresponding to different clinical contexts based on contextual attributes associated with the medical text and domain knowledge information that correlates the contextual attributes with the different clinical contexts; and training, by the system, a separate machine learning model to perform a natural language processing task on each group of the different text groups, resulting in different machine learning models respectively adapted to perform the natural language processing task on the different text groups such that each model of the different machine learning models is-tailored to a different clinical context, wherein the natural language processing task involves determining meanings of at least some words and phrases included in the different text groups, and wherein at least some of the meanings vary based on the different clinical contexts.

16. The method of claim 15, further comprising:

classifying, by the system, a text group of the different text groups that new medical text belongs to based on one or more contextual attributes associated with the new medical text indicating a clinical context of the new medical text; and identifying, by the system, identifies a machine learning model of the different machine learning models tailored to the text group; and applying, by the system, the machine learning model to the new medical text to generate an inference output tailored to the clinical context.

17. The method of claim 15, wherein each of the different text groups comprises a plurality of text samples extracted from two or more different reports of the plurality of medical reports.

18. A non-transitory machine-readable storage medium, comprising executable instructions that, when executed by a processor, facilitate performance of operations, comprising:

receiving a plurality of medical reports respectively comprising medical text;

extracting contextual attributes associated with the medical text from metadata respectively associated with the medical text;

separating the medical text into different text groups respectively corresponding to different clinical contexts based on contextual attributes associated with the medical text and domain knowledge information that correlates the contextual attributes with the different clinical contexts; and training a separate machine learning model to perform a natural language processing task on each group of the different text groups, resulting in different machine learning models respectively adapted to perform the natural language processing task on the different text groups such that each model of the different machine learning models is tailored to a different clinical context, wherein the natural language processing task involves determining meanings of at least some words and phrases included in the different text groups, and wherein at least some of the meanings vary based on the different clinical contexts.

19. The non-transitory machine-readable storage medium of claim 18, wherein the operations further comprise:

classifying a text group of the different text groups that new medical text belongs to based on one or more contextual attributes associated with the new medical text indicating a clinical context of the new medical text; and identifying a machine learning model of the different machine learning models tailored to the text group and applies the machine learning model to the new medical text to generate an inference output tailored to the clinical context.

20. The non-transitory machine-readable storage medium of claim 18, wherein at least some of the different text groups correspond to different subsections of at least some of the medical reports.

* * * * *